United States Patent [19]

Iwase et al.

[11] Patent Number: 5,787,752
[45] Date of Patent: Aug. 4, 1998

[54] METHOD TO MANUFACTURE CELL-CANS

[75] Inventors: Akira Iwase; Katsuhiko Mori, both of Hirakata; Yoshio Gohda, Yao; Susumu Kitaoka, Hirakata; Tokiya Fujimoto, Neyagawa; Tadahiro Tokumoto; Hisashi Komeno, both of Hirakata, all of Japan

[73] Assignee: Matsushita Electric Industrial Co., Ltd., Osaka, Japan

[21] Appl. No.: 615,839

[22] Filed: Mar. 14, 1996

[30] Foreign Application Priority Data

Mar. 15, 1995  [JP]  Japan ............... 7-055447
Mar. 17, 1995  [JP]  Japan ............... 7-058579

[51] Int. Cl.$^6$ .......... B21B 45/00; B21C 23/24; B21D 22/00; B21D 22/21
[52] U.S. Cl. ............... 72/349; 72/46; 72/379.4
[58] Field of Search ............... 72/46, 47, 347, 72/348, 349, 379.4

[56] References Cited

U.S. PATENT DOCUMENTS

| | | | |
|---|---|---|---|
| 3,293,895 | 12/1966 | Kohan et al. | 72/349 |
| 3,310,870 | 3/1967 | Parikh et al. | 72/46 |
| 3,316,625 | 5/1967 | Flint et al. | 72/46 |
| 3,765,206 | 10/1973 | Shah et al. | 72/47 |
| 3,820,368 | 6/1974 | Fukuzuka et al. | 72/47 |
| 4,407,149 | 10/1983 | Smith et al. | 72/47 |
| 4,457,150 | 7/1984 | Saunders et al. | 72/47 |

FOREIGN PATENT DOCUMENTS 5-89861  4/1993  Japan.

*Primary Examiner*—Lowell A. Larson
*Assistant Examiner*—Rodney Butler
*Attorney, Agent, or Firm*—Ratner & Prestia

[57] ABSTRACT

This invention relates to a method to manufacture cell-cans by DI can method, by manufacturing a bottomed cylindrical cup-shaped intermediate product from a sheet material of which both surfaces are nickel plated and annealed in an atmosphere of inert gas making the metal nickel layer thickness and the hardness at predetermined values, then ironing the intermediate product at a predetermined ironing rate, securing a thickness of the metal nickel layer of more than 1.0 µm and a Vickers hardness of more than HV 200 on the side wall of finished cell-cans. By this, conventional defect problems due to the cracks generated on the intermediate product can be solved completely and the problem of hair-lines formed on the surface of finished cell-can can be eliminated.

10 Claims, 2 Drawing Sheets

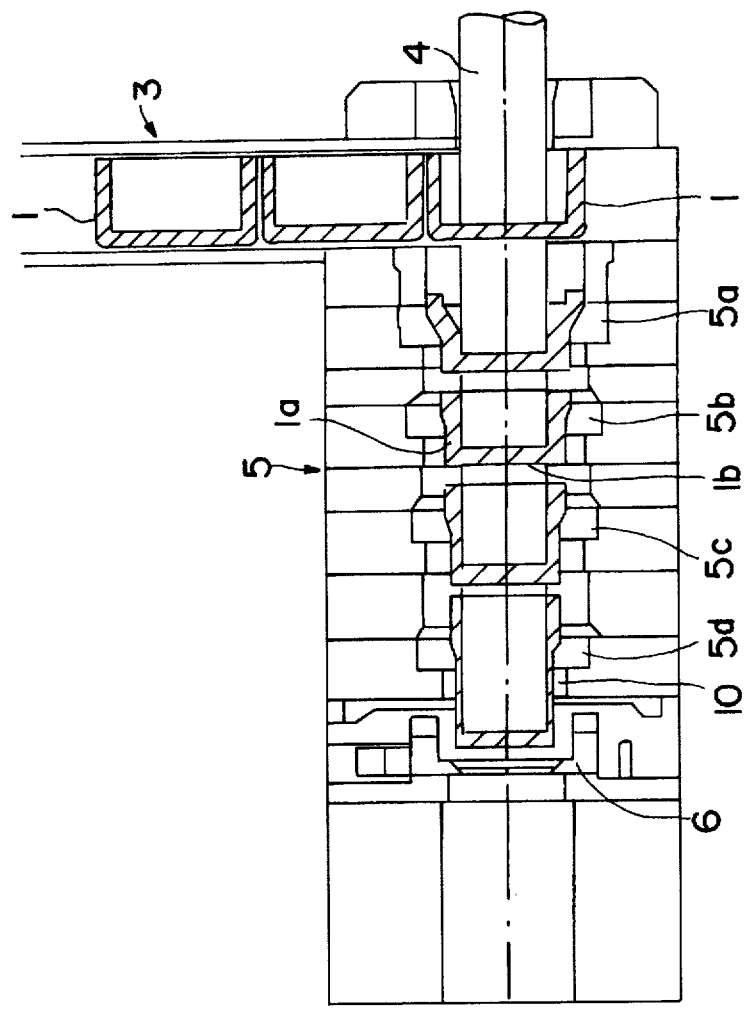
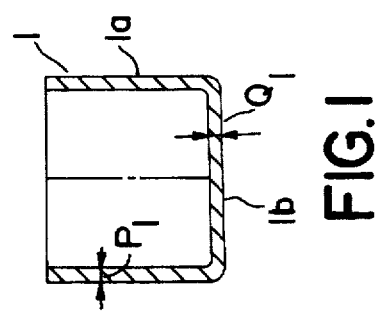

5,787,752

1

METHOD TO MANUFACTURE CELL-CANS

BACKGROUND OF THE INVENTION

This invention relates to a method to manufacture cell-cans made of nickel-plated steel sheet accommodating cylindrical cells designed for various battery systems, and relates particularly to a method forming said cell-cans to have a thickness of side-wall thinner than that of its bottom wall.

In various battery systems typified by alkaline batteries of alkaline-manganese system, nickel-cadmium system, nickel-metal hydride system or such, and typified by lithium primary batteries employing manganese dioxide, graphite fluoride, or iron disulfide as the cathode active material and typified further by lithium secondary batteries for example lithium-ion batteries, various cells having cylindrical, rectangular, or flat shape have been developed and utilized.

Among these, a numerous types of these cells having a circular cross-section such as the button type, coin type, or cylindrical type cells made of high precision components have been developed and mass-produced because of the easiness of cell assembling works and high reliabilities of sealing of liquid or gas.

Among these, the cylindrical type cell such as the sealed secondary battery having an overall height larger than its outer diameter have been considered suitable for constructing the cells having a relatively high discharge capacity utilizing its higher mechanical strength including the high pressure strength against the increased internal gas pressure.

The method forming said cell-cans accommodating the cell elements including the positive and negative electrodes, electrolyte, separator, etc., is a kind of plastic working, and a deep drawing press method forming the cell-cans made of metal sheet such as steel sheet in several steps by using a transfer-machine consisting mainly of several compression type die-mounted press-hammers, and a spinning method by which the sheet material is drawn by rolls together with the dies and tools had been well known as typical methods. While the cell-cans manufactured by either of these methods are formed conventionally to have an equal thickness of both the bottom and the side walls, the deep drawing press method is more advantageous for the mass-production, and the cans are nickel plated in general after the forming.

In manufacturing conventional cell-cans having a nearly equal thickness of the side wall and the bottom wall, a higher mechanical strength has to be provided y employing a thicker steel sheet in proportion to the larger outside diameter of cell-can. However, in accommodating a cylindrical cell into a cell-can, the cylindrical cell-can having a circular cross-section and a relatively flat cover or bottom wall is considered structurally advantageous even if a relatively thin side wall is employed.

Since the cylindrical cell used as a power supply of portable equipment has to be made to have a lighter weight and higher discharge capacity consistently, a cell-can manufacturing method obtaining a higher internal volume by employing a larger inside diameter and a lighter weight by employing a side wall thickness thinner than the bottom wall has been developed. For example, these had been manufactured by either the DI can (drawn and ironed can) methods disclosed by the Japanese Patent Application Open-Laying Nos. Sho-18005 and Hei 5-89861.

SUMMARY OF THE INVENTION

The first objective of this invention is to prevent the rejects due to the hair-line produced on the cell-cans. That is,

2 a method to solve the hair-line problems completely by manufacturing the cell-cans from the sheet material of which both surfaces are nickel plated and annealed in an atmosphere of inert gas, by preparing a bottomed cylindrical cup-shaped intermediate product by applying a deep drawing to the sheet material securing a thickness of metal nickel layer of more than 1.0 μm by applying an ironing work on the side wall thickness and increasing the height of side wall securing a thickness of metal nickel layer of "a" μm of both metal nickel layers remaining on the surfaces of annealed steel sheet in proportion to the ironing rate "b" % accomplished at the ironing work satisfying a below-shown relationship of:

"$a$"μm×(100−"$b$")/100≧1.0 μm.

The second objective of the invention is to prevent the crack rejects in manufacturing the bottomed cylindrical cup-shaped intermediate products formed into long torso cells. That is, the second objective of the invention is to offer a method to prevent the crack rejects in manufacturing the bottomed cylindrical cup-shaped intermediate products by applying a deep drawing onto the nickel-plated steel sheet annealed in a nitrogen atmosphere to have a Vickers hardness of HV 80 ~90, and to form these into cell-cans by ironing the side wall of the bottomed cylindrical cup-shaped intermediate product reducing its thickness increasing the height of said side wall and attaining a Vickers hardness of more than HV 200.

BRIEF DESCRIPTION OF THE DRAWINGS

FIG. 1 shows a cross-sectional view of bottomed cylindrical cup-shaped intermediate product of the invention.

FIG. 2 shows a cross-sectional view of the drawing and ironing machine which is used in the manufacturing method of the invention.

DESCRIPTION OF THE PREFERRED EMBODIMENTS

Figure 3:
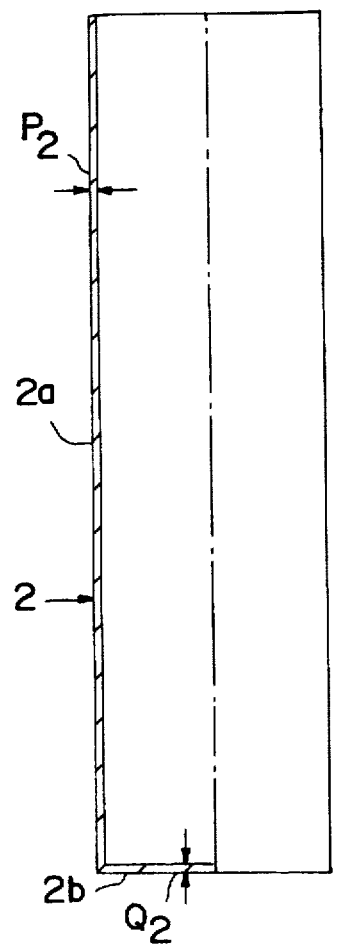
FIG. 3 shows a cross-sectional view of finished cell-cans to be formed into a long torso cells manufactured by the invented method.

According to manufacturing methods used in the present invention, a disk sheet having a Vickers hardness of approximately HV 100–120 punched out of nickel plated and annealed steel sheet in an inert gas atmosphere is deep drawn by using a press machine obtaining a bottomed cylindrical cup-shaped intermediate product having a cross-section shown in FIG. 1 wherein thickness $P_1$ of side wall is 1$a$ and thickness Q of bottom wall 1$b$ of the intermediate product shown in FIG. 1 are nearly equal.

Then, by using a drawing and ironing machine shown in FIG. 2 performing the redrawing and ironing processes simultaneously, thickness P of side wall 1$a$ of intermediate product 1 is reduced forming a higher side wall of finished cell-can utilizing the reduced thickness P of side wall 1$a$.

FIG. 2 shows a cross-sectional view of a typical drawing and ironing machine employed in the invented process, and a schematic working process of intermediate product 1. In FIG. 2, intermediate product 1 is intermittently placed into the individual forming positions of machine by carrier 3 where the intermediate product 1 is drawn into the outer shape of punch 4 by means of pressing punch 4 and redrawing die 5a. Although the outer diameter of intermediate product 1 is reduced considerably changing the shape of intermediate product 1 into a shape of long torso, but very little changes of the thickness of bottom and the side walls are produced by this redrawing process.

Then, intermediate product 1 is pressed by punch 4 and is successively passed through the first, second, and third ironing dies 5b, 5c, and 5d at one motion during which thickness P of side wall 1a is reduced and the height of side wall is increased in proportion to the decrease of thickness P, increasing the hardness of side wall somewhat during this period.

As redrawing die 5a and ironing dies 5b, 5c, and 5d of the first, second, and third stages tandemly disposed in a form of concentric circle are aligned with punch 4, and the inner diameters of ironing dies 5b, 5c, and 5d are smaller in proportion to the increased number of stages. Thus, thickness P of side wall 1a becomes thinner and the height of side wall becomes higher in proportion to the increased processes of redrawing and ironing during which intermediate product 1 is passed through the multi-stage dies explained in above.

Finished product 10 went through the redrawing and multi-stage ironing processes is removed by stopper 6, and the excess top open-end is cut-off yielding finished cell-can 2 shown in FIG. 3.

FIG. 3 shows a cross-sectional view of cell-can 2 finished by the invented method. In FIG. 3, the thicknesses of side wall 2a and bottom wall 2b are shown by P and Q respectively. Notice that thickness P of side wall 2a of cell-can 2 is reduced to a thickness less than thickness P of side wall 1a in proportion to the increased ironing stage, thickness Q of bottom wall 2b is unchanged remaining thickness Q of bottom wall 1b of intermediate product 1.

Comparing the new DI method over the conventional press method, a substantial reduction of the number of processes over those of conventional press method is obvious. Therefore, not only a higher productivity and a lower cost, but, at the same time, a cell-can having a lighter weight and higher discharge capacity can be obtained. Beside these, obtaining a number of advantages such as the higher mechanical strength of cell-can reducing the probabilities of gas and electrolyte leakage cased by the stress of corrosion cracking of can, a wider application filed of the DI method is now obtained.

However, fine vertical hair-lines had been observed often on the outer surface of side wall of the cell-can manufactured by the DI can method. Since the nickel plating of those cell-cans is peeled off and the surface of such hair lines is rusted easily producing poor appearances of cell-cans so that the cans of such had to be rejected. Once this kind of hair-line rejects took place, this tended to be continuously appeared on all of the cans so that all of the cans had to be rejected. These hair-lines were observed often with the high torso cell-cans such as the cans for AA (R6) size and AAA (R03) size cell-cans manufactured by applying a high ironing rate at the redrawing and ironing process.

Whereas the bottomed cylindrical cup-shaped intermediate product 1 having a higher overall height against the outer diameter had to be prepared in manufacturing the cells having a dimensional ration of the outer diameter to the overall height exceeding 3 . . 5, the hair-line troubles were often produced at a high rate within these intermediate product stages.

Figure 4:
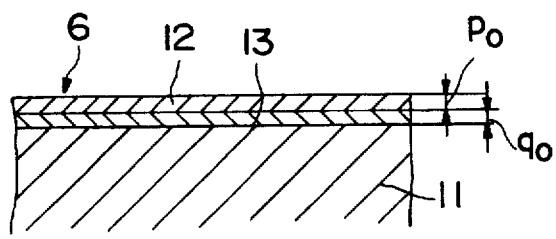
FIG. 4 shows a schematic metallurgical microscopic photograph taken on a cross-section of the one side surface of steel sheet of which both surfaces are nickel plated and annealed thereafter.

The present invention relates mainly to a method to manufacture the cell-cans solving these problems. First of all, the possible causes of these troubles were analyzed and determined by conducting below-shown series of experiments. In there, the both surfaces of 0.4 mm thick hoop-formed steel sheet are nickel electrolytic plated for a thickness of 3.5 μm, and this is annealed at a temperature of 600 C. for a period of 50 hrs in an atmosphere of nitrogen gas. FIG. 4 shows a schematic metallurgical microscopic observation made on a cross-section of annealed sheet material.

FIG. 4 shows clearly 3.5 μm-thick nickel layer 6 formed on the surface of steel sheet 11 is separated into metal nickel layer 12 having a thickness P of 2.2 μm and nickel-iron alloy layer 13 having a thickness of 1.7 μm respectively making a total thickness of 3.9 μm. The nickel-iron alloy layer 13 is formed by the thermal diffusion of nickel from the nickel plated layer into steel sheet 11 yielding metal nickel layer 12 having a thickness reduced by 1.3 μm counting from the beginning.

While the metal nickel layer 12 having a low hardness and a high drawing rate acting as a lubricant at the redrawing and ironing, the hardness of nickel-iron alloy layer 13 is higher. Thus, if steel sheet 11, metal nickel layer 12 and nickel-iron alloy layer 13 are ironed reducing the respective thicknesses according to the respective ironing rates of these, there should be no troubles.

Whereas the ironing process of metal nickel layer 12 had been controlled conventionally to secure a thickness of 0.64–0.96 μm, it have been found that the surface of metal nickel layer 12 is often broken by nickel-iron alloy layer 13 is exposed out of the surface of metal nickel layer 12 causing a direct contact of the nickel-iron alloy on the ironing dies, a partial damage thereof leaving hair-line scratches on the outer surface of side wall of cell-can.

Studying the thorough conditions between the thickness of nickel plated layer and the annealing, the relationship between the hardness and the thickness of metal nickel layer formed on the annealed steel sheet and the ironing rates at the drawing and ironing process have been determined. By these, a new cell-can manufacturing method reducing the probability of reject problems such as the cracks of bottomed cylindrical cup-shaped intermediate products is obtained, accomplishing higher industrial effects such as a higher manufacturing yield, lower production cost, and higher reliability of cell-can.

Embodiment-1

After the both surfaces of 0.4 mm thick hoop shaped steel sheet are nickel plated attaining various nickel thicknesses by an electrolytic plating, the steel sheet is annealed in an nitrogen atmosphere varying its temperature and period in order prepare samples. The cross-sections of each samples are observed by a metallurgical microscope determining the thickness of metal nickel layer and nickel—iron ally layer. After this, bottomed cylindrical cup-shaped intermediate products such as shown in FIG. 1 are formed from a disk punched out of steel sheet by applying a deep drawing process. Then, after applying an ironing process to the intermediate product by using a drawing and ironing machine shown in FIG. 2 in order to attain a predetermined ironing rate, the finished cell-can is obtained by cutting off the excess end of top opening. The result of these processes is summarized and shown in Table 1.

The thickness of all of the metal nickel layers secured on the both surfaces of side walls of finished cell-cans of Sample Nos. 1, 2 and 3 shown in Table 1.

The thickness of all of the metal nickel layers secured on the both surfaces of side walls of finished cell-cans of Sample Nos. 1, 2 and 3 shown in Table 1 are more than 1.0 μm, and no conventional hair-line defects were observed on the outer surface of side wall of finished cell-cans at these conditions.

TABLE 1

| Sample Number | 1 | 2 | 3 |
| --- | --- | --- | --- |
| Thickness of nickel plated layer (μm) | 3.5 | 3.5 | 5.0 |
| Annealing condition | | | |
| Temperature (C.) | 600 | 600 | 650 |
| Period (hr) | 50 | 24 | 50 |
| Thickness of metal nickel layer on the sheet material (μm) | 2.2 | 3.2 | 3.1 |
| Thickness of the nickel-iron alloy layer (mm) | 1.7 | 0.5 | — |
| Total thickness of side wall of intermediated product (mm) | 0.40 | 0.40 | 0.40 |
| Ironing rate (%) | 50 | 55 | 60 |
| Finished cell-can | | | |
| Thickness of side wall (mm) | 0.20 | 0.18 | 0.16 |
| Total thickness of metal nickel layer of side wall (μm) | 1.1 | 1.4 | 1.2 |

By specifying the thickness of metal nickel layer existing on the both surfaces of sheet material which the intermediate products are produced by "a" mm (corresponding to P shown in FIG. 4.) and the ironing rate in drawing and ironing processes as "b" %. Relation (1) shown below is established.

$$\text{"}a\text{"}\mu m \times (100-\text{"}b\text{"}/100 \geqq 1.0\ \mu m \quad (1)$$

Relation (1) can be rewritten in a form (2) shown below.

$$\text{"}a\text{"}\mu mm \times 1.0\ \mu m \times 100/(100-b) \quad (2)$$

Once the ironing rate "b" % were established from Relations (1) and (2), the thickness "a" mm of metal nickel layer existing on the both surfaces of annealed steel sheet material can be determined. The thickness "a" μm of metal nickel layer can be set at an arbitral value by varying the thickness of the first nickel plating and the annealing condition.

Moreover, while the thickness of metal nickel layers existing on the both surfaces of the side wall of cell-cans is an important factor preventing the hairlines on the outer surface of side wall of cell-cans in employing a DI can method, the formation of nickel-iron alloy layer between the steel sheet and the nickel plated layer produced by the nickel diffusion effect during the multi-stage ironing with redrawing and ironing process is an essential and important condition in respect of the prevention of peeling of metal nickel layer during the multistage ironing processes.

(Embodiment-2)

In here, bottomed cylindrical cup-shaped intermediate products such as shown in FIG. 1 having an outer diameter of 16.5 mm and an overall height of 20.44 mm are prepared by applying a deep drawing produced by a press machine. The respective thicknesses P and Q of side wall 1a and bottom wall 1b of the immediate product are the same with that of the sheet material which is 0.25 mm.

Then, after applying successive ironing processes attaining an ironing rate of 32% to the intermediate product by using a machine shown in FIG. 2, the excess end formed at the top opening is cut-off and removed obtaining an AAA size cell-can shown in FIG. 3. The outer diameter, the overall height, and thickness P of side wall 2a of the finished cell-can are 9.98 mm, 43.50 mm and 0.17 mm respectively.

Although these thicknesses are less than the thickness of starting sheet material, thickness Q of bottom wall 2b remains same as the initial thickness which is 0.25 mm. Moreover, the Vickers hardness of side wall of finished cell being can is found being increased to a value of HV 202. The Vickers hardnesses of side wall of finished cell-cans obtained by varying the ironing rate are tabulated in Table 2 showing a tendency of higher hardness of finished side wall in proportion to the higher ironing rate. Then, the mechanical strengths of cell-cans are evaluated by determining the loads producing cell-can cracks by expansion and the tensile strengths of cell-can itself.

| Sample No. | Ironing Rate | Thickness | Vickers Hardness |
| --- | --- | --- | --- |
| 11 | 25% | 0.188 mm | HV 195 |
| 12 | 32% | 0.170 mm | HV 202 |
| 13 | 35% | 0.163 mm | HV 205 |
| 14 | 45% | 0.138 mm | HV 215 |

The result of these shows that the mechanical strengths of cell-cans of samples Nos 12–14 excluding the cell-can of sample No. 11 are satisfactory for the practical use attaining side wall Vickers hardnesses of more than HV 200. Moreover, these facts have been confirmed also by repeating this experiment, telling that the adequate cell-can mechanical strength yielding a side wall Vickers hardness of more than HV 200 can be obtained when an ironing rate of more than 30% is employed. In this case, a steel sheet material having a Vickers hardness of approximately HV 85 which is same as that of starting material employed in this case has been employed.

Although cases employing the sheet material having a Vickers hardness of HV 85 have been explained, the prevention of crack defects in manufacturing the bottomed cylindrical cup-shaped intermediate products to manufacture cell-can having a height/outer-diameter ratio of more than 3.5 can be accomplished by employing a nickel-plated steel sheet showing a Vickers hardness within a range of HV 80–90 after annealing. However, in order to produce cell-cans with side wall having a Vickers hardness of more than HV 200, the ironing rate has to be set a value higher than the case employing Vickers hardness of HV 85 in cases employing a steel sheet material having a Vickers hardness of HV 80, and the ironing rate may be set at a lower value in a case steel sheet having a Vickers hardness of HV 90 is employed.

As above described detailed explanations, by manufacturing a bottomed cylindrical cup-shaped intermediate product from the sheet material of which both surfaces are nickel plated and annealed in an atmosphere of inert gas making the metal nickel layer thickness and the hardness at predetermined value, and then ironing the intermediate product at a predetermined ironing rate, the chances of rejects due to the crack defects produced on the bottomed cylindrical cup-shaped intermediate product and rejects due to hair-lines produced on the finished cell-cans can be eliminated completely.

Since the probabilities of these kinds of defects can be eliminated from cell-cans having a height/outer-diameter ratio of more than 3.5 particularly, the present invention is to offer a new method manufacturing cell-cans without defects producing a high industrial value.

Though the above-described explanations have been made consistently on the cell-cans to be formed into cylindrical cells, the application of present invention is by no means not restricted only within the method to form cylindrical cells, but is applicable to button type and coin type cells also.

What is claimed:

1. A method of manufacturing cell-cans comprising the steps of:

depositing nickel layers onto both sides of a steel sheet;

annealing said steel sheet with said nickel layers deposited thereon to form nickel alloy layers between each of said nickel layers and said steel sheet so that, after annealing, each of said nickel layers has a thickness greater than 1.0 μm;

forming a bottomed cylindrical cup-shaped intermediate product from said steel sheet; and forming a cell-can having an increased side wall height and a reduced side wall thickness by applying successive ironing processes to said intermediate product, wherein a thickness "a" of said nickel layers existing on both surfaces of said plated and annealed steel sheet satisfies the relation:

$$\text{"}a\text{"} \mu m \times (100 - \text{"}b\text{"})/100 \geq 1.0\ \mu m$$

where "b" is an ironing rate.

2. A method of manufacturing cell-cans according to claim 1, wherein a thickness "a" of said nickel layers existing on both surfaces of the steel sheet after annealing is controlled to be more than 2.0 μm when an ironing rate of more than 50% is applied in said successive ironing processes.

3. A method of manufacturing cell-cans according to claim 1, wherein a second Vickers hardness HV of said side wall of said manufactured cell-cans is adjusted to be more than 200 by using a steel sheet material having a first Vickers hardness HV in a range from 80 to 90.

4. A method of manufacturing cell-cans according to claim 1, wherein a dimensional ratio of an overall height to an outer-diameter of the finished cell-can is greater than 3.5.

5. A method according to claim 1 wherein said nickel layers are nonalloy.

6. A method of manufacturing cell-cans according to claim 1, wherein the thickness "a" of the nickel layers existing on both surfaces of the steel sheet after annealing is controlled to be more than 2.0 μm when an ironing rate of more than 50% is applied in said successive ironing processes.

7. A method of manufacturing cell-cans according to claim 1, wherein a second Vickers hardness HV of said side wall of said manufactured cell-cans is adjusted to be more than 200 by using a steel sheet material having a first Vickers hardness HV in a range from 80 to 90.

8. A method to manufacture cell-cans according to claim 1, wherein a dimensional ratio of an overall height to an outer-diameter of the finished cell-can is greater than 3.5.

9. A method to manufacture cell-cans according to claim 1, wherein a dimensional ratio of an overall height to an outer-diameter of the finished cell-can is greater than 3.5.

10. A method to manufacture cell-cans according to claim 7, wherein a dimensional ratio of an overall height to an outer-diameter of the finished cell-can is greater than 3.5.

* * * * *

UNITED STATES PATENT AND TRADE MARK OFFICE
CERTIFICATE OF CORRECTION

PATENT NO.    : 5,787,752
DATED         : August 4, 1998
INVENTOR(S)   : Iwase et al.

It is certified that error appears in the above-identified patent and that said Letters Patent is hereby corrected as shown below:

Cover page, item [56] References Cited, Foreign Patent Documents add the following:

0 629 009   12/1994   Japan
5-021044    1/1993    Japan

Column 8, line 24, delete " 1" and insert --2--.

Signed and Sealed this

Fourth Day of May, 1999

*Attest:*

Q. TODD DICKINSON

*Attesting Officer*    *Acting Commissioner of Patents and Trademarks*